Nov. 20, 1945. W. A. GEIGER 2,389,304
SHOCK ABSORBER
Filed Oct. 13, 1943
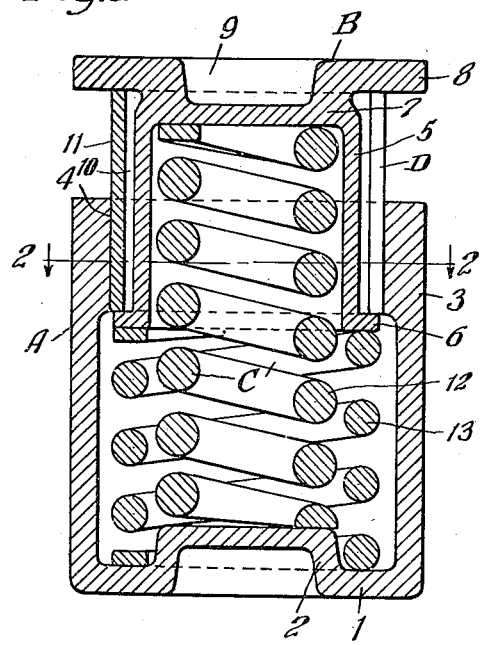
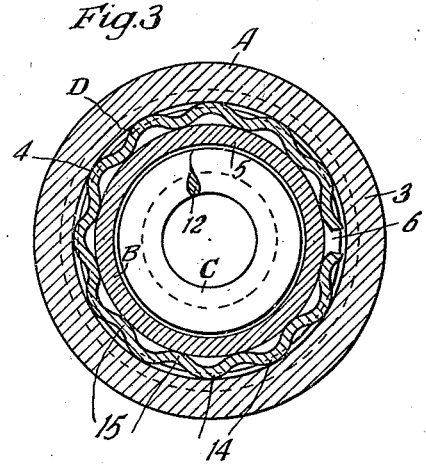
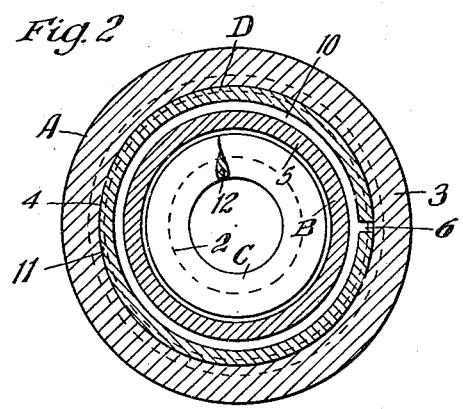
Inventor
William A. Geiger
By George D. Haight
Atty.

Patented Nov. 20, 1945

2,389,304

UNITED STATES PATENT OFFICE 2,389,304

SHOCK ABSORBER

William A. Geiger, Chicago, Ill., assignor to William P. Sidley, M. F. Back, Albert P. Withall, Edwin C. Austin, and George A. Johnson, all of Chicago, Ill., and Alice T. Miner, Chazy, N. Y., trustees of the William H. Miner Foundation Application October 13, 1943, Serial No. 506,083

3 Claims. (Cl. 267—9)

This invention relates to an improved shock absorbing device which is especially adapted for snubbing action of the truck springs of railway cars.

One of the objects of the invention is the provision of a shock absorber functioning as a snubbing device for the truck springs of railway cars, which shall have substantially uniform resistance to the relative movement of the truck parts.

A further object of the invention is to provide a shock absorber which shall serve in lieu of at least one of the coil springs of the usual set of springs employed in each cluster of truck springs and in which the snubbing action is obtained by two tubular members, one of which is urged into frictional engagement with the other by its own resiliency.

These and other objects of the invention, which will more clearly appear from the description and appended claims, are accomplished by a friction shock absorber structure in which the movement of a plunger within a cylindrical casing is frictionally resisted by a tubular frictional element positioned between the casing and the plunger, and forced into frictional engagement with the surfaces by virtue of its own inherent resiliency.

Referring now to the drawing which forms a part of this specification,

Fig. 1 is a vertical sectional view of a shock absorber embodying the invention;

Fig. 2 is a transverse section on the line 2—2 of Fig. 1; and

Fig. 3 is a transverse section similar to Fig. 2 but illustrating a modified embodiment of the invention.

Referring first to Figs. 1 and 2 of the drawing, the structure shown comprises a friction casing or shell A, a plunger or follower B, springs C, and a tubular friction member D.

The friction casing or shell a comprises a cylindrical, hollow member closed at its lower end by a bottom wall 1 and open at its top end. The bottom wall has an upwardly projecting hollow boss 2 to receive the usual spring centering projection of the bottom spring follower for the truck springs. The annular side wall of the shell at its upper end portion 3 is made thicker to provide an interior annular friction surface 4, the diameter of which is smaller than the interior of the shell proper.

The follower or plunger member B extends within the open upper end of the casing in telescoping relation thereto so as to have movement lengthwise thereof. This plunger is in the form of a hollow, cylindrical, tubular member 5, open at its bottom end and provided with a lateral outstanding flange 6 of sufficiently less diameter than the annular friction surface 4 of the casing, so that the plunger can be telescoped within the casing in assembling the structure. The plunger extends beyond the upper end of the casing sufficiently to allow for relative movement of the members, and its upper end is closed by the top wall 7 which is extended laterally to form an annular flange 8 of substantially exterior diameter of the casing. Its upper wall has a central depression or recess 9 which forms a seat for the usual centering projection of the top spring follower plate for the truck springs. The cylindrical portion 5 of the plunger is sufficiently less in diameter than the diameter of the friction surface 4 of the casing, to provide an annular space 10 for the reception of the friction element D.

The friction element D is in the form of a split tubular or cylindrical member of sufficient length to fit between the flanges 6 and 8 of the plunger. It is made of spring steel and its exterior surface 11 has frictional engagement with the annular friction surface 4 of the casing continuously throughout its circumference. The proper degree of frictional engagement of this element is obtained by making the element normally of larger exterior diameter than the diameter of the friction surface 4 and then contracting it against its own spring resistance in assembling it in the casing. Thus, in assembled relation, the expansion of the element, by virtue of its own tendency to return to its normal size, causes it to be expanded into sufficiently tight frictional engagement with the friction surface 4 to function properly as a snubbing action. This frictional engagement is substantially uniform throughout the length of its movement because of the concentricity of the element D with respect to the friction surface of the casing and because of the uniform diameters of the friction element D and the friction surface 4 throughout their length.

The spring resistance C to the telescoping movement of the plunger in the casing is provided by the concentrically disposed inner and outer coil springs 12 and 13, respectively. The inner spring extends from the bottom of the casing upwardly into the hollow plunger to the upper wall 7 thereof, against which the upper end of the spring is seated. The lower end of the spring is seated upon the boss 2 of the casing. The outer coil spring 13 has its lower end seated on the bottom wall of the casing at its upper end bearing against the flange 6 of the plunger.

In the modified form of Fig. 3, the structure is identical with that just described and shown in Figs. 1 and 2, with the exception that the wall of the friction element D is formed in waves or corrugations which extend lengthwise of the member so that the entire area of its exterior surface is not in engagement with the friction surface 4 of the casing. Instead, the outer apices 14 of the corrugations bear against the friction surface 4 at circumferentially spaced intervals, while the inner apices 15 bear against the exterior surface of the plunger. The apices 14 thus are in the nature of curved resilient ribs which provide the frictional engagement with the surface 4.

In this modification, thickness of the tubular members represented by the apices 14 and 15 is greater than the thickness of the space between the plunger and the friction surface 4 of the casing, so that when the parts are assembled the corrugations must be compressed against the normal resiliency of the metal, and when in place the corrugations will expand against the friction surface 4 of the casing to provide the desired frictional resistance to the movement of the plunger.

The operation of my improved shock absorber snubber is as follows: Assume that the parts are in the position shown in the drawing and that the device is mounted in the car truck between the bottom and top spring follower plates of the spring cluster. Upon compression of the spring cluster of the truck, the casing A and plunger B will be forced toward each other, the plunger being forced into the casing against the opposition of the springs 12 and 13. Since the friction elements D move with the plunger, it is in sliding engagement with the friction surface 4 of the casing and provides the necessary frictional resistance to snub the action of the truck springs and reduce the oscillations of said springs to a desired minimum. Upon the reverse action of the truck springs, that is, upon the expansion thereof, the plunger B and casing A move relatively apart under the expansive action of the springs 12 and 13, whereupon the frictional engagement of the element D with the casing again snubs the action of the truck springs.

I claim:

1. The combination of a friction casing open at one end and having an interior, longitudinally extending, annular friction surface at said open end, a plunger movable lengthwise within the casing in concentric relation thereto, said plunger having laterally projecting flanges at the inner and outer ends thereof, a longitudinally disposed metal tubular spring member split lengthwise and expanded by its own resiliency against the annular friction surface of the casing, said member being embraced between said flanges of the plunger so as to be moved in unison with the plunger and having direct frictional engagement with the annular friction surface of the casing, and springs within the casing opposing inward movement of the plunger.

2. In a shock absorber, the combination of a friction casing having an interior, longitudinally extending, annular friction surface, a plunger telescoped within the casing in concentric relation to said annular friction surface, said plunger and casing being relatively movable in lengthwise direction and said plunger being spaced from said friction surface, a tubular spring friction member disposed concentrically of said friction surface in the space between said plunger and said friction surface and being under compression between said friction surface and said plunger, the wall of said friction member being corrugated lengthwise to provide a plurality of spaced rib-like portions in frictional contact with said friction surface, and means within the casing yieldingly opposing inward movement of the plunger.

3. In a shock absorber, the combination of a friction casing open at one end and having an annular interior, longitudinally extending, friction surface at its open end, a cylindrical tubular plunger movable lengthwise within the casing and concentrically spaced therefrom to provide an annular space between itself and the friction surface, said plunger having laterally projecting flanges at its inner and outer ends, a tubular, longitudinally disposed, spring friction member embraced between said flanges to be moved in unison with the plunger, said friction member being fluted lengthwise to provide a plurality of longitudinal ribs on its interior and exterior surfaces and being under compression between the friction surface of the casing and the exterior wall of the plunger, and springs within the casing opposing the inward movement of the plunger.

WILLIAM A. GEIGER.